United States Patent [19]
Veyo et al.

[11] Patent Number: 6,025,083
[45] Date of Patent: Feb. 15, 2000

[54] FUEL CELL GENERATOR ENERGY DISSIPATOR

[75] Inventors: Stephen Emery Veyo, Murrysville; Jeffrey Todd Dederer, Valencia; John Thomas Gordon, Ambridge; Larry Anthony Shockling, Pittsburgh, all of Pa.

[73] Assignee: Siemens Westinghouse Power Corporation, Orlando, Fla.

[21] Appl. No.: 09/030,316

[22] Filed: Feb. 25, 1998

[51] Int. Cl.[7] .................................................. H01M 8/00
[52] U.S. Cl. .................................. 429/13; 429/23; 429/31
[58] Field of Search .................................. 429/13, 23, 31

[56] References Cited

U.S. PATENT DOCUMENTS

| | | |
|---|---|---|
| 4,431,715 | 2/1984 | Isenberg . |
| 4,490,444 | 12/1984 | Isenberg . |
| 4,555,452 | 11/1985 | Kahara et al. . |
| 4,562,124 | 12/1985 | Ruka . |
| 4,631,238 | 12/1986 | Ruka . |
| 4,748,091 | 5/1988 | Isenberg . |
| 4,791,035 | 12/1988 | Reichner . |
| 4,833,045 | 5/1989 | Pollack et al. . |
| 4,874,678 | 10/1989 | Reichner . |
| 4,876,163 | 10/1989 | Reichner . |
| 5,023,150 | 6/1991 | Takabayaski ................................ 429/23 |
| 5,045,414 | 9/1991 | Bushnell et al. . |
| 5,105,142 | 4/1992 | Takabayashi . |
| 5,108,850 | 4/1992 | Carlson et al. . |
| 5,258,240 | 11/1993 | Di Croce et al. . |
| 5,273,838 | 12/1993 | Draper et al. . |

FOREIGN PATENT DOCUMENTS

| | | |
|---|---|---|
| 58-164163 | 9/1983 | Japan . |
| 63-181268 | 7/1988 | Japan . |
| 01298649 | 12/1989 | Japan . |
| 02033866 | 2/1990 | Japan . |
| 06333586 | 12/1994 | Japan . |

*Primary Examiner*—Kathryn Gorgos
*Assistant Examiner*—Thomas H Parsons
*Attorney, Agent, or Firm*—Eckert Seamans Cherin & Mellot, LLC

[57] ABSTRACT

An apparatus and method are disclosed for eliminating the chemical energy of fuel remaining in a fuel cell generator when the electrical power output of the fuel cell generator is terminated. During a generator shut down condition, electrically resistive elements are automatically connected across the fuel cell generator terminals in order to draw current, thereby depleting the fuel inventory in the generator. The invention provides a safety function in eliminating the fuel energy, and also provides protection to the fuel cell stack by eliminating overheating.

10 Claims, 3 Drawing Sheets

FUEL CELL GENERATOR ENERGY DISSIPATOR

GOVERNMENT CONTRACT

The Government of the United States of America has certain rights in this invention pursuant to Contract No. DE-FC21-91MC28055 awarded by the U.S. Department of Energy.

FIELD OF THE INVENTION

The present invention relates to fuel cell generators, and more particularly relates to an energy dissipator which reduces unwanted heat build-up in the combustion zone of the generator during shut-down of the generator.

BACKGROUND INFORMATION

Conventional solid oxide fuel cell (SOFC) generators typically include tubular fuel cells arranged in a grouping of rectangular arrays. Each fuel cell has an upper open end and a lower closed end, with its open end extending into a combustion zone. A typical tubular fuel cell has a cylindrical inner air electrode, a layer of electrolyte material covering most of the outer surface of the inner air electrode, and a cylindrical fuel electrode covering most of the outer surface of the electrolyte material. An interconnect material extending along the length of the fuel cell covers the circumferential segment of the outer surface of the air electrode which is not covered by the electrolyte material. An electrically conductive strip covers the outer surface of the interconnect material, and allows electrical connections to be made to an adjacent fuel cell or bus bar. The air electrode may comprise a porous lanthanum-containing material such as lanthanum manganite, while the fuel electrode may comprise a porous nickel-zirconia cermet. The electrolyte, which is positioned between the air and fuel electrodes, typically comprises yttria stabilized zirconia. The interconnect material may comprise lanthanum chromite, while the conductive strip may comprise nickel-zirconia cermet. Examples of SOFCs are disclosed in U.S. Pat. No. 4,431,715 to Isenberg, U.S. Pat. No. 4,490,444 to Isenberg, U.S. Pat. No. 4,562,124 to Ruka, U.S. Pat. No. 4,631,238 to Ruka, U.S. Pat. No. 4,748,091 to Isenberg, U.S. Pat. No. 4,791,035 to Reichner, U.S. Pat. No. 4,833,045 to Pollack et al., U.S. Pat. No. 4,874,678 to Reichner, U.S. Pat. No. 4,876,163 to Reichner, U.S. Pat. No. 5,108,850 to Carlson et al., U.S. Pat. No. 5,258,240 to Di Croce et al., and U.S. Pat. No. 5,273,838 to Draper et al., each of which is incorporated herein by reference.

During operation of the fuel cell generator, air is provided to an inside air electrode of each tubular cell, and hydrogen-rich fuel is supplied to an outside fuel electrode surface. The fuel and oxidant are utilized electrochemically to produce electrical energy. The depleted air, comprising about 16 percent oxygen, exits the open end of the cell, and the spent fuel of low hydrogen concentration is eventually discharged into a combustion area surrounding the cell open ends.

During normal run conditions, the fuel gas entering the SOFC combustion zone has a low concentration of hydrogen due to the fuel being consumed within the cell stack. In addition, a relatively large amount of oxygen depleted air exits the cells, keeping the air/fuel ratio well beyond stoichiometric in the combustion plenum. This helps to keep the combustion zone temperature at approximately 950° C., well within the allowable range for the cells. In addition, the high volumetric flow of air out of each cell may be sufficient to protect the air electrode and open end from any risk of hydrogen reduction.

However, during certain generator stop conditions with the stack in an open circuit condition, e.g., loss of grid connection, the air supply may be reduced to a maximum of about 10 percent or less of the normal airflow. The fuel flow to the generator is replaced with a reducing purge flow which serves to protect the fuel electrode from oxidation. This purge flow also causes any stored fuel within the generator to be pushed into the combustion zone where it burns with the available air. There are two primary concerns with this situation. First, the air/fuel ratio is closer to stoichiometric and will result in more combustion and a hotter combustion zone temperature. Second, the reduced air flow leaving each cell may not be sufficient to completely protect the open ends of the cells from hydrogen reduction. Either of these problems have the potential for causing damage to the fuel cells.

The above-noted problems may be reduced or eliminated if the hydrogen can be prevented from reaching the combustion zone in any significant quantity. The present invention has been developed in view of the foregoing and to address other deficiencies of the prior art.

SUMMARY OF THE INVENTION

The present invention provides a fuel cell generator in which the stack terminals are connected through a resistor, thereby continuing to draw current in order to consume the fuel stored within the generator at the beginning of a "STOP" transient operation. The current is dissipated in the resistor as heat, and the problems associated with the oxidation of hydrogen-rich fuel in the combustion zone of the fuel cell generator are reduced or eliminated.

An object of the present invention is to provide a fuel cell generator which converts hydrogen-containing fuel and oxygen-containing gas to electrical energy, and which includes an energy dissipator that draws current from the generator after the generator shuts down in order to consume at least a portion of the hydrogen-containing fuel remaining in the generator.

Another object of the present invention is to provide a method of dissipating energy during shutdown of a fuel cell generator. The method includes the steps of converting hydrogen-containing fuel and oxygen-containing gas to electrical energy in the fuel cell generator, and drawing current from the generator after the generator shuts down to thereby consume at least a portion of the hydrogen-containing fuel remaining in the generator. After the fuel is oxidized, the energy dissipator is passively and automatically disconnected. This is preferably done without any reliance or need for any external source of energy.

These and other objects of the present invention will be more apparent from the following description.

DESCRIPTION OF THE PREFERRED EMBODIMENT

Figure 1:
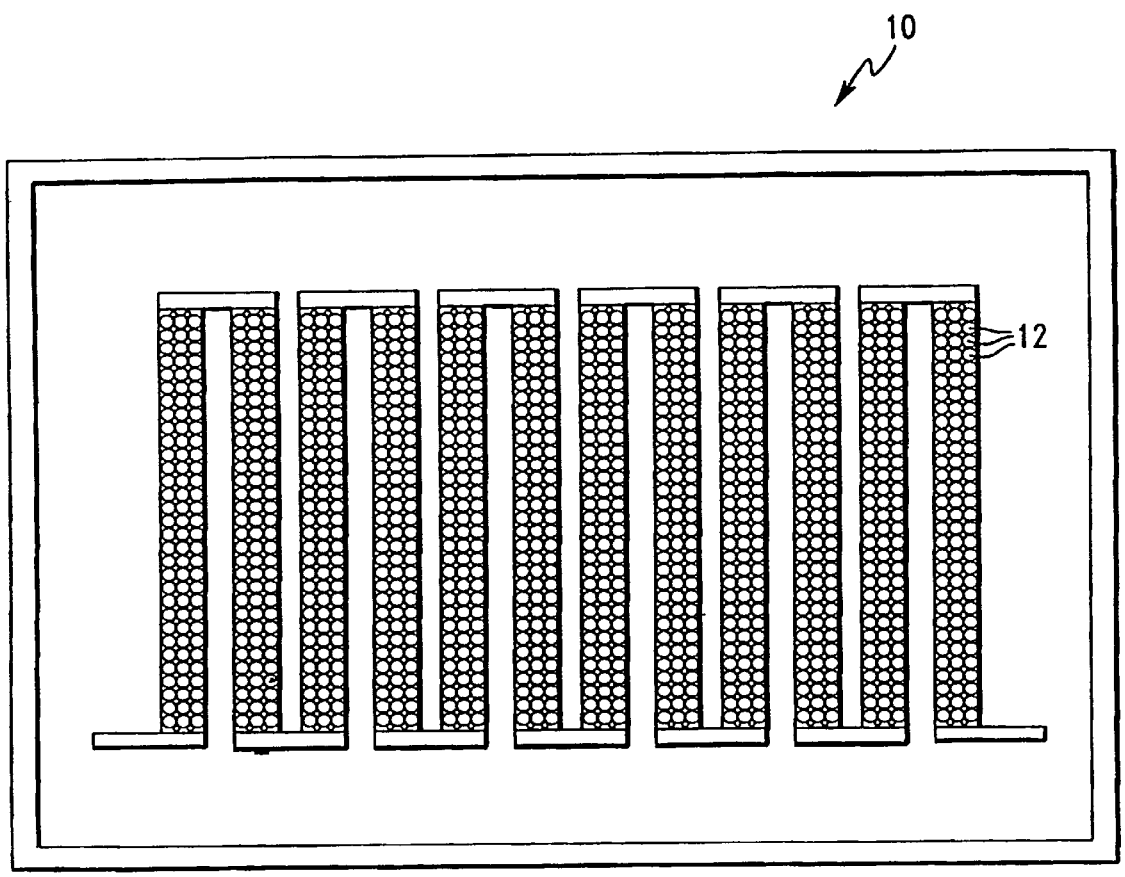
FIG. 1 is a schematic plan view of a SOFC generator stack showing the arrangement of multiple tubular fuel cells within the generator.

FIG. 1 is a schematic top view of a conventional SOFC generator stack 10 showing the arrangement of multiple tubular fuel cells 12 within the generator.

Figure 2:
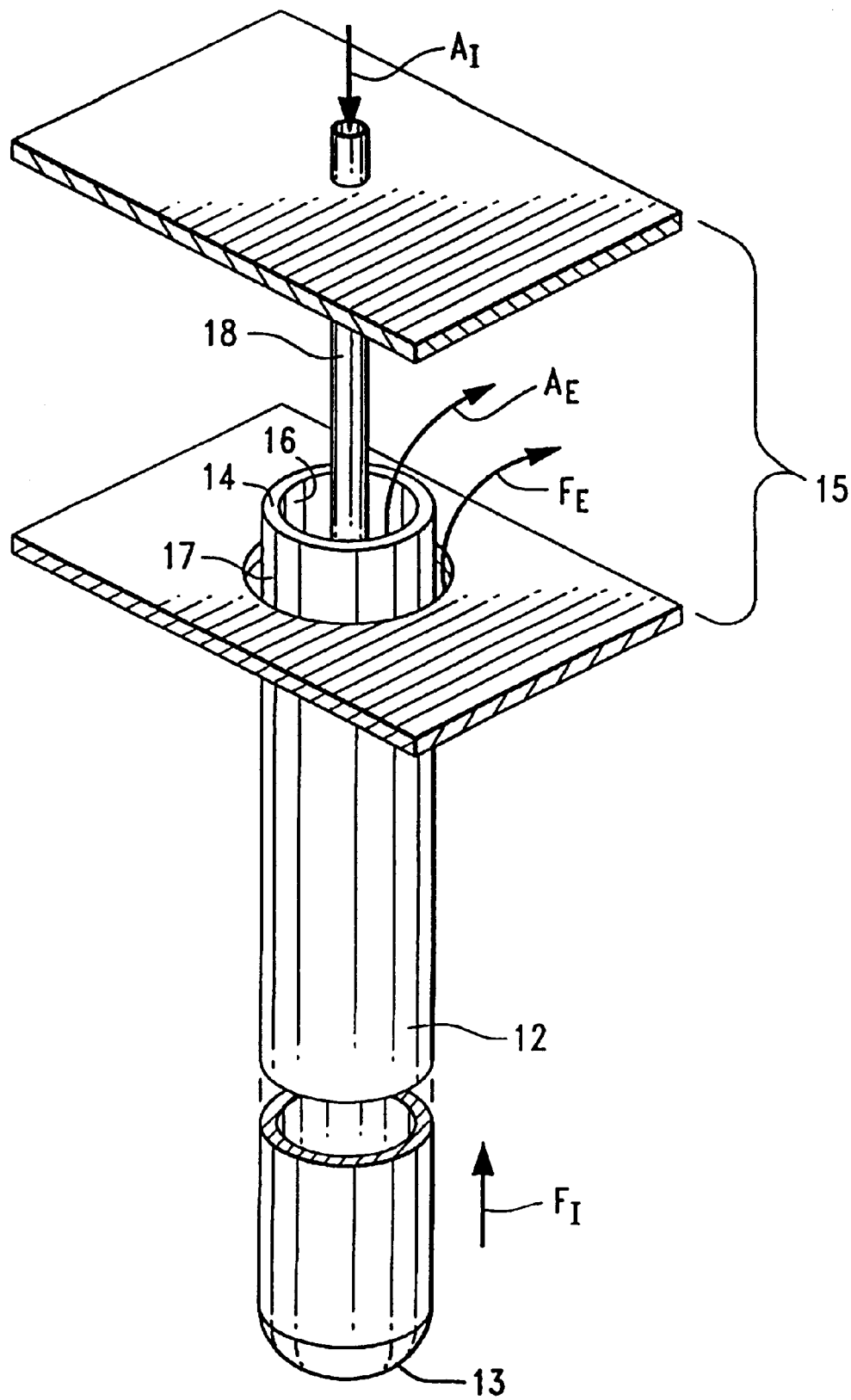
FIG. 2 is a perspective view of an individual tubular fuel cell having an open top end which extends into the combustion zone of a fuel cell generator.

FIG. 2 is a perspective view of an individual tubular fuel cell 12 having a bottom end 13 and a top end 14 which extends into a combustion zone 15 of the fuel cell generator. The inner layer of the fuel cell 12 comprises a porous air electrode 16, while the outer layer of the fuel cell comprises a porous fuel electrode 17. During normal operation of the fuel cell, oxygen-containing gas such as air $A_I$ is introduced into the fuel cell 12 by a tube 18. After the air or other oxygen-containing gas is injected by the tube 18 into the fuel cell 12, it is exhausted $A_E$ through the open upper end 14 of the fuel cell. During electrical power generation operations, the air exiting the fuel cell 12 has a reduced oxygen content due to its consumption within the cell. Hydrogen-containing fuel $F_I$, typically in the form of reformed natural gas or the like, flows along the exterior of the fuel cell 12 in contact with the porous fuel electrode 17. During electrical power generation operations, most of the hydrogen in the fuel is consumed in a known manner to produce electrical energy. However, during shutdown of the generator, the hydrogen is no longer consumed and the fuel $F_E$ passing into the combustion zone 15 is hydrogen-rich. At the same time, the oxygen-containing gas $A_E$ injected into the fuel cell 12 is no longer depleted, and oxygen-rich gas exhausts through the open end 14 of the fuel cell into the combustion zone 15. Thus, during a generator shutdown, the introduction of additional hydrogen and oxygen into the combustion zone 15 causes more combustion and higher temperatures within the combustion zone.

In accordance with the present invention, increased temperatures in the combustion zone 15 are reduced or eliminated by drawing current from the fuel cell 12 during shutdown of the generator. As used herein, the term "shutdown" means the opening of the electrical load circuit consisting of the SOFC dc output and any electrical loading device such as a DC/AC inverter system. The energy dissipator of the present invention preferably includes at least one electrical resistor which dissipates electrical energy from the fuel cells in the form of heat. The electrical resistor(s) may be of any suitable size and resistance. For example, an electrical resistor of around 6.5 ohms resistance encased in a stainless steel bar weighing approximately 43 pounds will suffice for a 100 kW SOFC stack design. This results in a temperature rise of 300° F. if the metal bar is not cooled. These parameters may be changed depending on the particular stack design that this device will be employed with. The electrical resistor may optionally be cooled by a fluid. For example, the resistor may be air cooled or may be cooled by a liquid such as water.

During normal operation of the fuel cell generator, the operating temperature in the combustion zone is usually from about 850 to about 1,000° C. However, during shutdown of conventional generators, the temperature in the combustion zone may increase by 100° C. or more. In accordance with the present invention, the buildup of heat in the combustion zone upon shutdown of the generator is substantially prevented. Preferably, the temperature in the combustion zone does not increase by more than about 30° C. after the generator shuts down.

Figure 3:
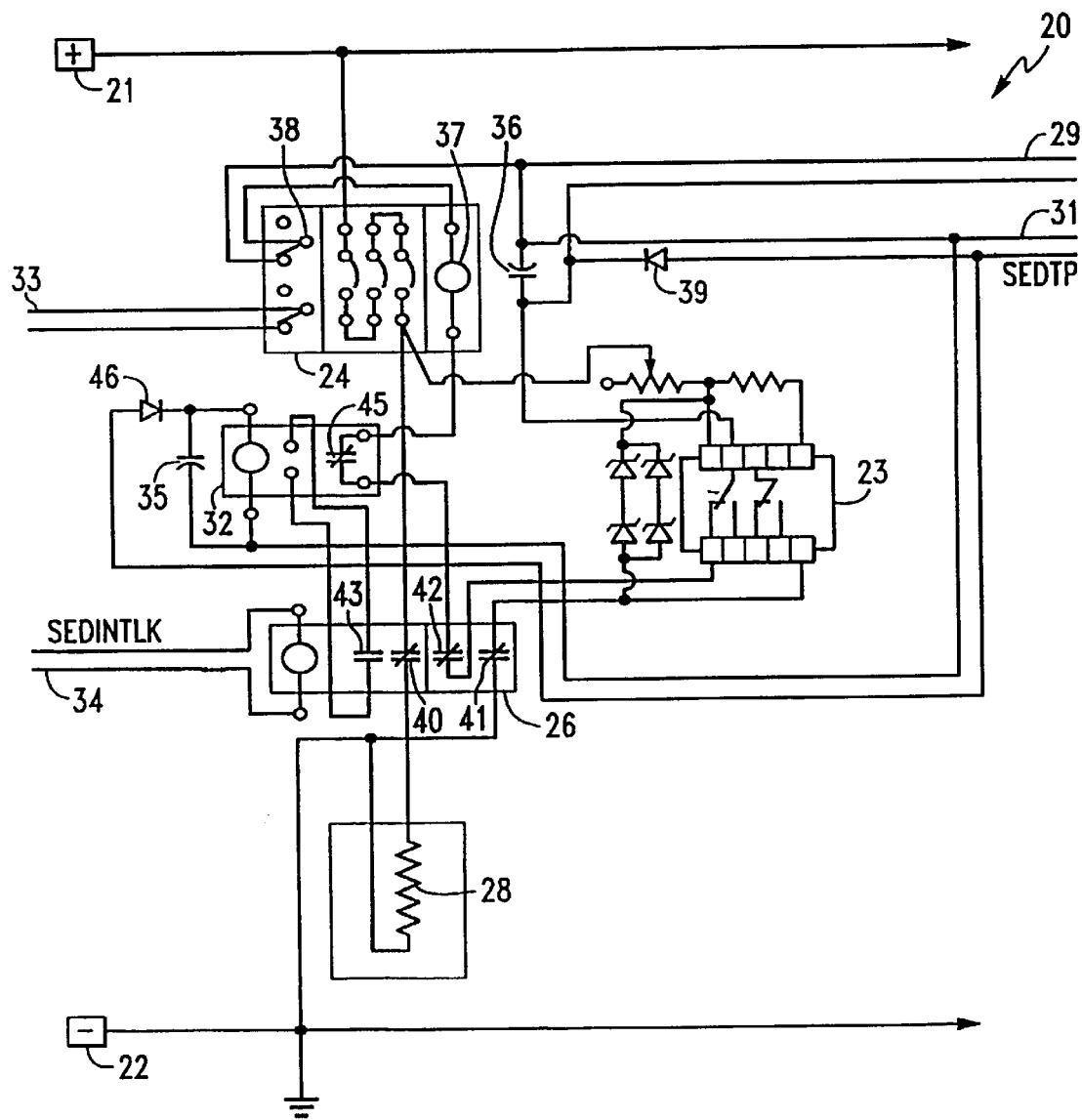
FIG. 3 is a schematic diagram of a fuel cell generator energy dissipator in accordance with an embodiment of the present invention.

FIG. 3 is a schematic diagram of a fuel cell generator energy dissipator 20 in accordance with an embodiment of the present invention. The energy dissipator 20 is connected across the main positive and negative terminals 21 and 22 of the fuel cell generator. The major components of the energy dissipator include a passive voltage sensor 23 that takes its power from the power bus being sensed, a shunt trip circuit breaker 24 to disconnect the resisting elements or fire rods 28 from the power bus 21 and 22 at the appropriate low voltage level, a contactor 26 that opens the dissipator circuit when operating conditions are normal, a timer 32 that holds the trip circuit open until the sensing circuits have come to steady state after being actuated, and two capacitors that provide sufficient energy to power the timer 32 and the circuit breaker 24 trip circuit should all power be lost.

The energy dissipator of the present invention reduces the energy stored within the generator in the event of a normal stop (STOP) or safety stop (SSTOP) condition, which may occur, for example, when the power conditioning system (PCS) has faulted and disconnected the generator load. The stored energy is the result of residual fuel trapped within the generator containment, after the fuel supply system has been shut down. The energy dissipator switches the load away from the PCS, and dissipates the energy into the steam supply system fire rods 28. Dissipating this energy helps to protect the generator stack from excessive temperatures when a sudden loss of load event occurs. The energy dissipator preferably must function under either an uninterrupted power supply (UPS) failure, or a facility power failure, or both.

In accordance with an embodiment of the present invention, the energy dissipator operates as follows. The operation of the stack energy bleed circuit may be initiated over leads 34 from a control computer (not shown) by de-activation of the stack energy dissipator interlock channel SEDINTLK. The signal from this channel de-activates the contactor 26. This signal additionally can originate or interlock from a pilot control circuit should there be a failure of the control computer. This signal can also originate from a high threshold voltage sensitive relay that switches automatically when the voltage step increase results when the open circuit occurs as the generator is shut down. The arrangement of the contactor 26, circuit breaker 24 and a fixed resistor 28 all connected in series, serves to place a shunt path across the main terminals 21 and 22 of the SOFC generator. Upon activation, the shunt path provides a controlled short circuit through the fixed resistor elements 28 across the SOFC terminals which consumes the fuel inventory in the stack. After a period of time when the stack voltage falls below a certain point due to the consumption of the remaining trapped fuel, the controlled short circuit is removed automatically with the voltage sensitive relay 23 which trips on low voltage.

Operation of the circuit requires only an initiating signal from the control computer. The initiating signal is the removal of the SEDINTLK control voltage. After the initiating signal, the circuit is autonomous and requires no further sequencing from the control computer. Alternatively, a voltage sensitive relay can be activated after the system current is started and the initial voltage drop has occurred in order to provide an initiating signal as described above. The sequence of operation is as follows.

The control computer de-activates contactor 26. The main contacts 40 close and impose the controlled short circuit across the SOFC dc mains 21 and 22. At the same time, the auxiliary contacts 42 within the contactor close-in the low energy shunt trip circuit. This arms the shunt trip circuit of the circuit breaker 24. Other auxiliary contacts 41 within the contactor connect the voltage sensitive relay 23 across the SOFC dc mains 21 and 22. This permits the voltage sensitive relay 23 to monitor the dc mains voltage. The third set of auxiliary contacts 43 open and start an adjustable time period in timer 32. Once timed out, internal contacts 45 in the timer close and permit or arm the tripping of the circuit breaker 24. This timing cycle obviates transient conditions within the voltage sensing relay 23 from causing premature tripping of circuit breaker 24. Once the trapped fuel in the stack is substantially consumed due to the controlled short circuit, the voltage sensitive relay 23 will sense a decreasing voltage across the SOFC dc mains 21 and 22. The threshold voltage for the voltage sensing relay 23 will cause it to activate when its input voltage falls below a level which, for example, may be selected to be approximately one half of the normal open circuit voltage of the SOFC generator. This indicates that the fuel rich gas in the stack has been substantially consumed.

When the low voltage threshold is reached, the voltage sensing relay 23 contacts close-in the shunt trip circuit. This causes the energy stored in the capacitor 36 to discharge through the low energy shunt trip coil 37 of the circuit breaker 24. This action opens the circuit breaker 24 and thereby removes the controlled short circuit across the SOFC dc mains 21 and 22. A set of circuit breaker 24 auxiliary contacts 38 remove any sustained voltage from being impressed across the low energy shunt trip coil. The auxiliary contacts open when the shunt trip coil is tripped open. This ends the sequence. Before restart, the circuit breaker 24 is manually reset. A circuit breaker status indicator 33 may optionally be used to indicate whether the circuit breaker 24 is tripped. Leads 29 may be connected to a sensor (not shown) which indicates whether the capacitor 36 is charged.

The removal of the shunt path may be implemented with a dc circuit breaker to assure the interruption of the dc current arc. Furthermore, this embodiment permits the necessary removal of the controlled short circuit to be accomplished without UPS power. In this embodiment, the low energy shunt trip requires only that the capacitor be charged, and does not need any other power to function, thereby providing for passive operation of the energy dissipator.

Since a normally closed contact 40 in the contactor 26 is used, then not only normal stop events can be served by this energy bleed circuit, but also the rare but possible event of an UPS failure could also be addressed by this scheme. If the control computer monitors the UPS condition, then upon the potential imminent failure of the UPS source, the control computer would issue a final command to de-energize the stack. From that point forward the entire above described sequence can proceed to its normal conclusion and passively bleed the stack energy from the SOFC generator without the need for the UPS or any other source of power.

The following examples illustrate various aspects of the present invention, the design considerations and testing methods, and are not intended to limit the scope thereof.

EXAMPLE 1

Stack energy dissipator control and current interrupting circuits were tested under simulated full load conditions using a 0–500 VDC power supply, and a separate 0–25 amp dc power supply. Individual components were first tested without high dc current or voltage. The shunt trip capacitor charge and discharge characteristics were tested using a 24 volt dc power supply. The contactor 26 circuit and timer 32 were also tested with the same dc power supply. The system was tested by simulating both a UPS failure, and a normal stop (STOP) or safety stop (SSTOP) trip. A STOP can be considered a normal system shutdown mode, while a SSTOP is a faulted condition that could present a physical danger to personnel. All contacts and signals to external circuit connections were verified at the terminal strips to assure that the wiring to the terminal strips was correct.

A test verified that the charging circuit would adequately charge and hold the shunt trip capacitor through a diode. The diode 39 is in the circuit to prevent the capacitor 36 from discharging back through the charging circuit. The dc power supply provided the trip power energization signal SEDTP 31 which would originate from a 24 volt dc power supply on the UPS through the leads 31. The interlock SEDINTLK leads 34 are wired parallel to the channel SEDTP from the power supply. By using toggle switches in the circuit, the SEDTP 31 and/or SEDINTLK signals 34 could be disconnected in any sequence. A 3,300 $\mu$F electrolytic capacitor 36 charges within seconds and holds sufficient charge for more than 30 minutes. The diode 39 in the charging circuit is a 100 volt, 3 amp diode.

Another test was conducted to verify the operation of the contactor and the auxiliary contacts mounted to the top of the contactor 26. Under normal generator operating conditions, the coil of the contactor 26 would be energized, and a set of primary normally closed contacts 40 would open. The open primary contacts 40 prevent current from flowing through the fixed resistor 28. A set of normally closed auxiliary contacts 41 on the contactor 26 also open under normal generator operation, and disconnect the voltage sensing relay 23 from the dc bus. A second set of normally closed auxiliary contacts 42 is also used to assure that the shunt trip does not actuate as long as the interlock signal SEDINTLK 34 is high. One set of normally open contacts 43 is connected across the timer inhibit terminals of the timer 32 to provide a shorting timer inhibit signal which maintains the contacts 45 open thereby disarming the shunt trip action of the circuit breaker 24 as long as the contactor 26 is energized.

In the event of a fault, the coil of the contactor 26 is de-energized, three sets of contacts 40, 41 and 42 close, and one set 43 opens. The primary contacts 40 allow current to flow through the fixed resistor 28, and one set of auxiliary contacts 41 connect the voltage sensing relay leads to the dc bus. The voltage sensing relay becomes active. The second set of auxiliary contacts 42 arms, but does not trigger the shunt trip. The auxiliary contacts 43 break the timer inhibit action of the timer 32.

Continuing the test, a 24 volt dc signal is used to simulate the SEDINTLK 34 signal from the SOFC system programmable logic controller. With the 24 volt dc power applied, the contactor 26 actuates. Under steady application of power, the coil remains cool.

In this example, the contactor 26 is a 40 amp device. The maximum expected current from the SOFC generator during the dissipation cycle is 25 amps. Using a 25 amp current supply, current was permitted to flow through the contactor 26 and circuit breaker 24. The circuit breaker 24 is a 3-pole, 600 VDC, 125 amp device. The dc voltage rating is achieved by connecting the 3 poles in series.

In normal operation, the coil of the timer 32 is energized. A set of normally closed timer contacts 45 which open upon energizing the coil are placed in series with the voltage sensing relay 23 and the breaker 24 shunt trip coil. When a SOFC system fault occurs, the timer 32 holds its contacts open for several seconds. This allows time for the voltage sensing relay 23 to change states when the voltage sensor power and sensing leads are closed on the dc bus. Under normal operation, the voltage sensing relay 23 is not connected to the generator terminals. This prevents a constant power draw through the voltage sensing relay 23 during normal operation. In the event of a fault, the set of contactor contacts 41 close, and the voltage sensing relay 23 is connected to the bus. When rated bus voltage is sensed (>340 VDC), the voltage sensing relay 23 will change states. A set of normally closed contacts (shunt trip trigger) on the voltage sensing relay 23 must open, otherwise, the shunt trip circuit will be closed. The timer 32 contacts, being in series with the circuit breaker 24 shunt trip coil, and open at the instant of the fault signal, prevent an unwanted shunt trip actuation by holding the contacts open for several seconds.

This delay allows the voltage sensing relay 23 contacts to move from closed to open without tripping the breaker. After the timer 32 completes the delay cycle (based on its setting) the timer contacts 45 close, but now the voltage sensing relay 23 contacts are open.

Any suitable delay time may be used. For example, delay ranges of about 0.15–3 seconds, 1.5–30 seconds, 15–300 seconds, and the like, up to hours of delay time, are possible.

The timer 32 requires continuous power to remain active and, because the coil must be energized during normal operation, there should not be a loss of power to the relay if a fault occurs. If the power is lost, the timing function of the relay would be lost, and the contacts would immediately close. This would cause an undesired shunt trip of the circuit breaker 24.

The timer 32 contacts include power contacts and sensing contacts. The sensing contacts require a shorting wire to hold off the timing function. As long as the sensing contacts are shorted, the relay remains stable. If the short is removed, the timing function is initiated. For example, removing the short from the sensing contacts may cause the timer 32 contacts to close three seconds later. The delay time is selected in order to allow the voltage sensing relay 23 to change states, and to eliminate an accidental shunt trip.

To circumvent the above-noted problem of power loss, a 3,300 $\mu$F capacitor 35 is installed across the terminals of the timer 32. A diode 46 is also provided in the charging circuit. By adding this capacitor, the timer 32 may continue to operate for a sufficient length of time after loss of UPS. This time delay provides sufficient time for the interlock signal SEDINTLK 34 to drop out, and from there, the energy dissipator operates normally. Thus, with the loss of UPS, the timing function of the timer 32 is not inadvertently implemented. Delaying the loss of power to the timer 32 holds the contacts in the open state. Once the capacitor charge has been used and the timer 32 power is lost, the contacts toggle to their dead state.

The voltage sensing relay 23 is the relay that senses the bus voltage and triggers the shunt trip breaker when the voltage drops below a set value. In this example, the voltage sensing relay 23 is a 240 dc volt relay, with an additional 3,500 ohm adjustable resistor in series with the power contacts. This resistance is based on a SOFC bus voltage of 400 VDC, and a maximum sensor current draw of 0.046 amps from tests. The sensing terminals also require a 4,700 ohm, 35 watt resistor. In the normal operating state of the generator, there is no power applied to the voltage sensing relay 23, and its relay contacts are normally closed. When a fault is indicated, the 4-pole contactor 26 closes the low side of the voltage sensing relay 23 to the low side of the bus, and the voltage sensing relay 23 immediately changes states, assuming the bus voltage is above the threshold voltage.

In this example, there are two dials on the voltage sensing relay 23. The setting dial determines the threshold voltage, above which the sensor changes states. The setting range is preferably between 85 percent and 105 percent of the voltage sensing relay 23 power rating. By setting the dial to 85 percent, the sensor relay contacts may be actuated at its lowest value. At the voltage sensing relay 23 power terminals this voltage is about 204 VDC, which translates into a bus voltage of about 340 VDC. The second dial is the release ratio. This setting ranges from 95 percent to 75 percent of the sensor rating. By setting this dial to 75 percent, the sensor can be set to release at its lowest setting. The dials are set at 85 percent and 75 percent, which gives a latch-in setting of 340 VDC or greater, and a release voltage of 255 VDC (0.85·0.75·400). From tests, the true release voltage is determined to be 245 VDC. This voltage is within the acceptable release voltage range and dissipates the stored energy in the stack.

Once the individual components are tested, the components are wired together and the appropriate currents and voltages are applied. The 24 VDC signals originate from a single power supply with two toggle switches wired in parallel. One switch is labeled SEDTP 31 for the UPS power supply, and the other is labeled SEDINTLK 34 to simulate the interlock signal from the programmable logic controller. By having the toggle switches in the circuit, the loss of SEDTP 31 and SEDINTLK 34 signals can be simulated in any sequence and combination.

When the SEDINTLK 34 signal is lost first, regardless of the status of the UPS, the energy dissipator control circuits will initiate an energy dump. Two limitations exist. One is that the dump cycle must be completed within, e.g., thirty minutes. This time limit is determined by the 3,300 $\mu$F capacitor across the breaker shunt trip coil. The second limitation is that the bus voltage must be above, e.g., 340 VDC, otherwise, the voltage sensing relay 23 will not latch itself in. This limitation is determined by the 85 percent latch-in setting on the voltage sensing relay 23.

When a UPS failure occurs first (SEDTP 31 goes low), the timing relay 32 loses its primary power source. The timer 32 is driven directly from the SEDTP 31 signal. The timer 32 may be powered from this signal so that the SEDINTLK signal 34 does not need to charge the capacitor. Alternatively, charging the capacitor from the SEDINTLK 34 may be possible. In the test configuration, the SEDINTLK signal 34 goes low within 12 seconds after losing the UPS. The 12 second time constraint is determined by the capacitor that is installed across the timer 32 power contacts. Should a UPS failure occur without a loss of the SEDINTLK signal 34, the contactor 26 contacts in the voltage sensor 23 circuit will remain open, and the voltage sensing relay 23 sensor will not sense the bus voltage. Should a UPS failure occur with no loss of the SEDINTLK 34 within 12 seconds, the timer 32 contacts will close. Then, when the interlock signal is lost, the voltage sensing relay 23 sensor will be attached to the bus but not toggle in time. As a result, the shunt trip breaker 24 will trip immediately. The timer capacitor may alternatively be charged from the SEDINTLK 34 signal, for example, if the 24 VDC interlock source is sufficient to supply the charging current.

EXAMPLE 2

A change was made to the energy dissipator drop-out voltage level of Example 1. The test was conducted with a voltage sensor 23 drop-out voltage of 270 volts DC. The setting is at 93 percent of the nominal voltage, which corresponds to the 270 VDC level.

The energy dissipator control and current switching circuits were tested under open circuit and full load conditions using a Variac stack and rectifier as a power supply. The power supply was used to simulate the SOFC generator 350 VDC bus. Open circuit tests were made to confirm that the voltage level settings on the voltage sensing relay 23 and the timing operation of the delay circuit were both correct.

A load test was performed using the fixed resistor as the energy dissipator. All 24 VDC control circuits SEDINTLK 34 and SEDTP 31 were controlled by the SOFC system programmable logic controller, simulating actual normal stop (STOP) or safety stop (SSTOP) conditions. From the test data obtained, it was demonstrated that the voltage sensor 23 trip levels, the timing circuit, and the dissipator circuits operated to the desired specifications.

In the load test, the power supply voltage was set at 350 VDC, which was slightly above the nominal voltage of 341 VDC. All energy dissipator circuits were set to their ready state, and the control system was set to the normal operating state. A normal stop (STOP) command was entered through the control panel, and the energy dissipator circuits were activated. The power supply voltage dropped from 350 volts to approximately 325 volts DC after the load was connected. A load current of 20.8 amps to the fixed resistor was measured. The timer cycled out, and because the bus voltage was above 290 VDC, the fixed resistor 28 continued to draw current. The power supply voltage was manually reduced, and at approximately 256 VDC the voltage sensing relay 23 tripped the breaker 24, and the circuit to the fixed resistor 28 was disconnected. The measurements from the open circuit and full load tests are listed in Table 1.

TABLE 1

OPEN CIRCUIT TESTS

| DC Power Supply (Volts) | Voltage Sensor Terminal (Volts) | Remarks |
| --- | --- | --- |
| 49.7 | 35.5 | 17 second breaker trip delay circuit timing |
| 100.4 | 14.3 | 17 second breaker trip delay circuit timing |
| 200.9 | 143 | |
| 340.0 | 238 | Voltage sensing relay tripped at 256—259 Volts DC |
| 280.4 | 196 | Voltage sensing relay does not latch (below 290 VDC) |
| 295.9 | 206 | Voltage sensing relay latches and holds (above 290 VDC) |
| 380.5 | 247 | |
| 409.8 | 254 | |
| 419.6 | 258 | |
| 429.2 | 260 | |
| LOAD TEST | | |
| 350.7 | 228 | 20.8 Amps to fixed resistor voltage sensing relay trips at 261 VDC |

EXAMPLE 3

An energy dissipator similar to that described in Example 2 is installed in a 100 kW SOFC generator operating on natural gas as the hydrogen-containing fuel source. During testing of the SOFC power generator system, a STOP condition was entered at different times. Each time the fuel cell generator energy dissipator functioned as designed. The combustion zone did not overheat and no evidence of resulting damage to the fuel cells was observed.

The present invention provides a relatively simple method for providing protection to the cell stack of a solid oxide fuel cell generator. An electrical resistor may be used to short the fuel cell stack terminals during a shutdown condition. This resistor may take a variety of forms to provide the correct resistance and heat capacity to limit the temperature rise. An electrical circuit may be used to automatically switch the shorting resistor across the cell stack terminals, and to remove the resistor when the fuel is consumed.

Whereas particular embodiments of this invention have been described above for purposes of illustration, it will be evident to those skilled in the art that numerous variations of the details of the present invention may be made without departing from the invention as defined in the appended claims.

What is claimed is:

1. A fuel cell generator comprising:

means for converting hydrogen-containing fuel and oxygen-containing gas to electrical energy; and means for drawing current from the generator after the generator shuts down to thereby consume at least a portion of the hydrogen-containing fuel remaining in the generator, wherein the means for drawing current from the generator comprises at least one electrical resistor cooled by a fluid.

2. The fuel cell generator of claim 1, wherein the means for converting hydrogen-containing fuel and oxygen-containing gas to electrical energy comprises a plurality of tubular solid oxide fuel cells having an inner air electrode in contact with the oxygen-containing gas, an outer fuel electrode in contact with the hydrogen-containing fuel, and an open end extending into a combustion zone in flow communication with the oxygen-containing gas and the hydrogen containing fuel.

3. The fuel cell generator of claim 1, wherein the generator comprises a combustion zone in flow communication with the hydrogen-containing fuel and the oxygen-containing gas, and the means for drawing current from the generator substantially prevents a buildup of heat in the combustion zone after the generator shuts down.

4. The fuel cell generator of claim 3, wherein an operating temperature in the combustion zone is from about 850 to about 1,000° C., and the temperature in the combustion zone does not increase by more than about 30° C. after the generator shuts down.

5. The fuel cell generator of claim 1, wherein the means for drawing current from the generator comprises a passive switching circuit.

6. An energy dissipator for a fuel cell generator comprising:

at least one resistor; and means for connecting the at least one resistor across positive and negative terminals of a fuel cell generator when the generator shuts down, wherein the at least one resistor is cooled by a fluid.

7. The energy dissipator of claim 6, wherein the means for connecting the at least one resistor across the fuel cell generator terminals comprises a passive switching circuit.

8. The energy dissipator of claim 6, further comprising means for disconnecting the at least one resistor from the fuel cell generator terminals after at least a portion of fuel remaining in the generator is consumed.

9. The energy dissipator of claim 8, wherein the means for disconnecting the at least one resistor comprises:

means for sensing a decreased voltage level across the fuel cell generator terminals; and means for disconnecting the at least one resistor after the decreased voltage level is sensed.

10. A method of dissipating energy during shutdown of a fuel cell generator comprising:

converting hydrogen-containing fuel and oxygen-containing gas to electrical energy in a fuel cell generator;

shutting down the fuel cell generator; and drawing current from the fuel cell generator with at least one fluid-cooled electrical resistor after the generator shuts down to thereby consume at least a portion of the hydrogen-containing fuel remaining in the generator.

* * * * *